US011968312B2

(12) United States Patent
Lee et al.

(10) Patent No.: US 11,968,312 B2
(45) Date of Patent: Apr. 23, 2024

(54) APPARATUS AND METHOD FOR CLOUD-BASED VEHICLE DATA SECURITY MANAGEMENT

(71) Applicant: ELECTRONICS AND TELECOMMUNICATIONS RESEARCH INSTITUTE, Daejeon (KR)

(72) Inventors: Sang-Woo Lee, Daejeon (KR); Dae-Won Kim, Daejeon (KR); Jin-Yong Lee, Daejeon (KR); Boo-Sun Jeon, Daejeon (KR); Bo-Heung Chung, Daejeon (KR); Hong-Il Ju, Daejeon (KR); Joong-Yong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 262 days.

(21) Appl. No.: 17/527,861

(22) Filed: Nov. 16, 2021

(65) Prior Publication Data

US 2022/0166632 A1   May 26, 2022

(30) Foreign Application Priority Data

Nov. 24, 2020  (KR) .......................... 10-2020-0159309

(51) Int. Cl.
*H04L 9/32*   (2006.01)
*H04L 9/08*   (2006.01)

(52) U.S. Cl.
CPC .......... *H04L 9/3247* (2013.01); *H04L 9/0825* (2013.01); *H04L 9/0866* (2013.01); *H04L 9/3263* (2013.01)

(58) Field of Classification Search
CPC ... H04L 9/3247; H04L 9/0825; H04L 9/0866; H04L 9/3263; H04L 9/3242;
(Continued)

(56) References Cited

U.S. PATENT DOCUMENTS 8,160,764 B2 *  4/2012  Choi ...................... G08G 1/205
                                                      701/25
9,230,433 B2 *  1/2016  Lee ....................... G08G 1/0125
(Continued)

FOREIGN PATENT DOCUMENTS

KR   10-2009-0040622 A   4/2009
KR   10-2017-0134804 A   12/2017
(Continued)

*Primary Examiner* — J. Brant Murphy (57) ABSTRACT

Disclosed herein are an apparatus and method for processing vehicle data security based on a cloud. The method may include requesting, by a vehicle, a cloud center device to register a cloud-based vehicle data security service; generating, by the cloud center device, cloud-based vehicle data security policies and a pseudonym for the vehicle; requesting, by the cloud center device, an authentication center to generate a pseudonym certificate for the pseudonym and receiving the pseudonym certificate; transmitting, by the cloud center device, the cloud-based vehicle data security policies, the pseudonym, and the pseudonym certificate to the vehicle; generating, by the vehicle, vehicle state information, including accident record information and driving entity information, based on the cloud-based vehicle data security policies and transmitting the same to the cloud center device; and storing, by the cloud center device, the accident record information and the driving entity information in a database for each vehicle.

16 Claims, 7 Drawing Sheets

(58) Field of Classification Search
CPC . H04L 2209/42; H04L 2209/84; H04L 63/20;
G06F 21/62; G06Q 50/30
See application file for complete search history.

(56) References Cited

U.S. PATENT DOCUMENTS

| | | | |
|---|---|---|---|
| 10,736,126 B2* | 8/2020 | Cho | H04W 72/566 |
| 11,348,385 B2* | 5/2022 | Park | G07C 5/0816 |
| 11,677,568 B2* | 6/2023 | Ryu | B60R 11/00 |
| | | | 713/156 |
| 2010/0122080 A1* | 5/2010 | Lee | H04L 9/3255 |
| | | | 726/4 |
| 2011/0213968 A1* | 9/2011 | Zhang | H04L 67/12 |
| | | | 713/158 |
| 2014/0074387 A1* | 3/2014 | Lee | G08G 1/0125 |
| | | | 701/117 |
| 2018/0255562 A1* | 9/2018 | Cho | H04W 4/42 |
| 2019/0043201 A1* | 2/2019 | Strong | G06V 10/96 |
| 2019/0116048 A1* | 4/2019 | Chen | H04L 9/0819 |
| 2019/0245705 A1* | 8/2019 | Kumar | H04L 63/065 |
| 2020/0175788 A1* | 6/2020 | Park | G07C 5/0816 |
| 2020/0218729 A1* | 7/2020 | Ryu | G06F 16/29 |
| 2020/0220737 A1* | 7/2020 | Ryu | G06F 16/29 |
| 2020/0235946 A1 | 7/2020 | Lee et al. | |
| 2020/0372583 A1* | 11/2020 | Yang | G07C 5/0858 |

FOREIGN PATENT DOCUMENTS

| | | |
|---|---|---|
| KR | 1020200052852 A | 5/2020 |
| KR | 10-2020-0091689 A | 7/2020 |
| KR | 10-2020-0092471 A | 8/2020 |
| KR | 1020200092472 A | 8/2020 |

\* cited by examiner

APPARATUS AND METHOD FOR CLOUD-BASED VEHICLE DATA SECURITY MANAGEMENT

CROSS REFERENCE TO RELATED APPLICATION

This application claims the benefit of Korean Patent Application No. 10-2020-0159309, filed Nov. 24, 2020, which is hereby incorporated by reference in its entirety into this application.

BACKGROUND OF THE INVENTION

1. Technical Field

The disclosed embodiment relates generally to a method and apparatus for managing vehicle data security based on a cloud, and more particularly to a method and apparatus for managing the security of vehicle accident records and information about the entity driving a vehicle.

2. Description of the Related Art

When a vehicle accident occurs, the event data recorder of a vehicle stores information, such as the driving state of the vehicle and the like, for a certain time period before and after the vehicle accident, for later use of the information to determine the cause of the accident. Here, the event data recorder stores vehicle state information including the speed of the vehicle, information about whether seat belts are fastened, and information about whether an airbag is deployed.

Existing investigations after a vehicle accident are performed by extracting and interpreting data using the onboard diagnostic port (OBD II) of a vehicle. Here, data in the event data recorder may be damaged or changed due to illicit attempts to read the data, and there is a concern about malicious changes and deletion of the data.

Generally, data measured by various kinds of sensors installed in a vehicle is temporarily stored because data pertaining to a certain time period is continuously updated in the memory of the event data recorder. When an event satisfying certain preprogrammed conditions (e.g., deployment of an airbag) occurs, data cached for five seconds before a collision or for 0.2 to 0.3 seconds after the collision is recorded in the memory of the event data recorder. In contrast, data on a small accident that does not satisfy the preset event conditions is overwritten with new data in the memory.

Although such small accidents account for a large proportion of all accidents that are covered by insurance, the above-described method for recording event data makes it difficult for investigators to use event data related to such small accidents due to the limited size of a storage space.

Meanwhile, information about the entity driving a vehicle is information for identifying the driving entity when the vehicle is being driven, that is, for determining whether the vehicle is being driven by a driver or a vehicle system. These days, with the increasing use of autonomous vehicles and vehicle driving assistance systems, a determination of whether a vehicle is being driven by a human driver, an autonomous driving system, or a vehicle driving assistance system at the time of an accident is becoming important data for dealing with the vehicle accident. However, the method of extracting information about the entity driving a vehicle through an existing OBD-II port has the same problem as the problem with the extraction method of the existing event data recorder.

Also, in order to investigate a traffic accident and detect a driving entity at the time of the traffic accident, government organizations, insurance companies, vehicle manufacturers, and the like first identify and trace a specific vehicle (e.g., the vehicle involved in the accident) and then individually collect information required for detecting the cause of the accident, vehicle defects, factors aggravating or alleviating the accident, and the like from respective data sources. This information may include data in the event data recorder. However, the method of collecting information in this way requires a lot of time and expenses. Further, some of the data sources may not be identified, data may be unavailable although the data source is identified, or data may have already been deleted. Accordingly, in order to automatically identify a data source including traffic accident data and acquire such data in a timely manner, a system for collecting and storing vehicle accident record information and information about a driving entity and a method related thereto are required.

SUMMARY OF THE INVENTION

An object of the disclosed embodiment is to securely maintain vehicle accident record information and information about the entity driving a vehicle, which are stored in the vehicle, without loss caused due to the capacity of memory and without forgery or falsification caused by an external attack.

Another object of the disclosed embodiment is to solve a privacy invasion problem attributable to the exposure of the history of locations traveled to by a vehicle when vehicle accident record information and information about the entity driving the vehicle are acquired.

A cloud center device according to an embodiment includes memory in which at least one program is recorded and a processor for executing the program. The program may perform generating cloud-based vehicle data security policies, which are formats of data to be stored in a cloud, and a pseudonym for a vehicle in response to a request to register a cloud-based vehicle data security service from the vehicle, requesting an authentication center to generate a pseudonym certificate for the generated pseudonym, receiving the pseudonym certificate generated by the authentication center, and transmitting the generated cloud-based vehicle data security policies to the vehicle along with the pseudonym and the pseudonym certificate.

Here, the program may perform generating the cloud-based vehicle data security policies and the pseudonym when the vehicle is verified based on the identifier thereof.

Here, the program may receive a message signed with the private key of the vehicle from the vehicle and verify the message using the public key of the vehicle.

Here, the pseudonym may be set to have a validity period.

Here, the pseudonym certificate may be a message signed with the digital signature of the authentication center for the pseudonym.

Here, the program may further perform storing vehicle state information received from the vehicle in a database, the vehicle state information including accident record information and driving entity information generated based on the cloud-based vehicle data security policies.

Here, the vehicle state information may further include vehicle manufacturer identification information, and the program may store the accident record information and the driving entity information of the vehicle in the state of being sorted by vehicle manufacturer.

Here, the vehicle state information may further include an integrity verification value for each of the accident record information and the driving entity information.

An apparatus for recording vehicle data according to an embodiment includes memory in which at least one program is recorded and a processor for executing the program. The program may perform requesting a cloud center device to register a cloud-based vehicle data security service and receiving cloud-based vehicle data security policies, which are formats of data to be stored in a cloud, a pseudonym for a vehicle, and a pseudonym certificate from the cloud center device.

Here, before requesting the cloud center device to register the cloud-based vehicle data security service, the program may further perform transmitting a message signed with a private key to the cloud center device and receiving a vehicle authentication response from the cloud center device, and the program may perform requesting the cloud center device to register the cloud-based vehicle data security service when the vehicle is successfully authenticated.

Here, the program may perform generating vehicle state information, including accident record information and driving entity information of the vehicle, based on the cloud-based vehicle data security policies, and transmitting the vehicle state information to the cloud center device.

Here, the vehicle state information may further include vehicle manufacturer identification information.

Here, the vehicle state information may further include an integrity verification value for each of the accident record information and the driving entity information.

A method for managing vehicle data security based on a cloud according to an embodiment may include requesting, by a vehicle, a cloud center device to register a cloud-based vehicle data security service; generating, by the cloud center device, cloud-based vehicle data security policies, which are formats of data to be stored in the cloud, and a pseudonym for the vehicle; requesting, by the cloud center device, an authentication center to generate a pseudonym certificate for the generated pseudonym and receiving, by the cloud center device, the pseudonym certificate generated by the authentication center; transmitting, by the cloud center device, the generated cloud-based vehicle data security policies to the vehicle along with the pseudonym and the pseudonym certificate; generating, by the vehicle, vehicle state information, including accident record information and driving entity information of the vehicle based on the cloud-based vehicle data security policies, and transmitting, by the vehicle, the vehicle state information to the cloud center device; and storing, by the cloud center device, the accident record information and the driving entity information in a database on a per-vehicle basis.

Here, before requesting the cloud center device to register the cloud-based vehicle data security service, the method may further include transmitting, by the vehicle, a message signed with the private key thereof to the cloud center device; verifying, by the cloud center device, the message signed with the private key, which is received from the vehicle, using the public key of the vehicle; and transmitting, by the cloud center device, a result of authentication of the vehicle to the vehicle, and requesting the cloud center device to register the cloud-based vehicle data security service may be performed when the vehicle is successfully authenticated.

Here, the pseudonym may be set to have a validity period, and the pseudonym certificate may be a message signed with the digital signature of the authentication center for the pseudonym.

Here, the vehicle state information may further include vehicle manufacturer identification information, and storing the accident record information and the driving entity information may be configured such that the cloud center device stores the accident record information and the driving entity information of the vehicle in the state of being sorted by vehicle manufacturer.

Here, the vehicle state information may further include an integrity verification value for each of the accident record information and the driving entity information.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method according to an embodiment will be described in detail with reference to FIGS. 1 to 6.

Figure 1:
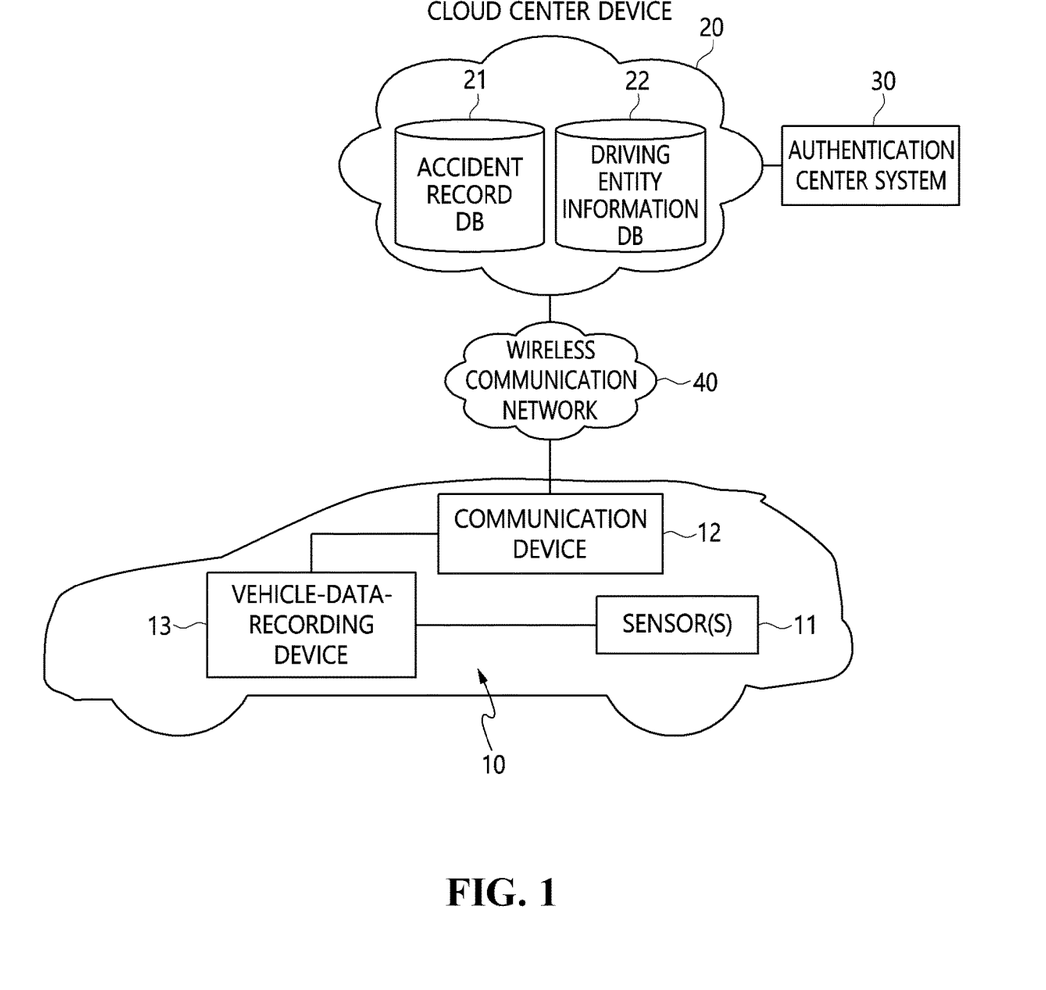
FIG. 1 is a schematic diagram of a system for managing vehicle data security based on a cloud according to an embodiment.

FIG. 1 is a schematic diagram illustrating a system for managing vehicle data security based on a cloud according to an embodiment.

Referring to FIG. 1, the system for managing vehicle data security based on a cloud is configured such that a vehicle 10 and a cloud center device 20 operate in conjunction with each other via a wireless communication network 40.

The vehicle 10 according to an embodiment includes various sensors 11, a communication device 12, and a vehicle-data-recording device 13.

Here, the vehicle-data-recording device 13, which is a device for recording information on a vehicle state before and after an accident, acquires vehicle state data before and after an accident from the various sensors 11 and requests the cloud center device 20 to store the vehicle state data by transmitting the same thereto via the communication device 12. Here, the vehicle state data before and after an accident may include accident record information and information about a driving entity. The operation of the vehicle-data-recording device 13 will be described in detail later with reference to FIG. 2 and FIG. 4.

The cloud center device 20 is a data center resident in a cloud. The cloud center device 20 includes an accident record database (DB) 21 and a driving entity information DB 22, and stores the vehicle data before and after an accident, which is transmitted from the vehicle 10, in the accident record DB 21 and the driving entity information DB 22 along with the identifier of the vehicle. The operation of such a cloud center device 20 will be described in detail later with reference to FIG. 3 and FIG. 4.

An authentication system 30 generates a pseudonym certificate by authenticating the pseudonym of the vehicle 10, which is generated by the cloud center device 20, and provides the same to the cloud center device 20. The use of such a pseudonym solves the problem of privacy invasion due to the exposure of information about the history of locations traveled to by the vehicle 10.

Figure 2:
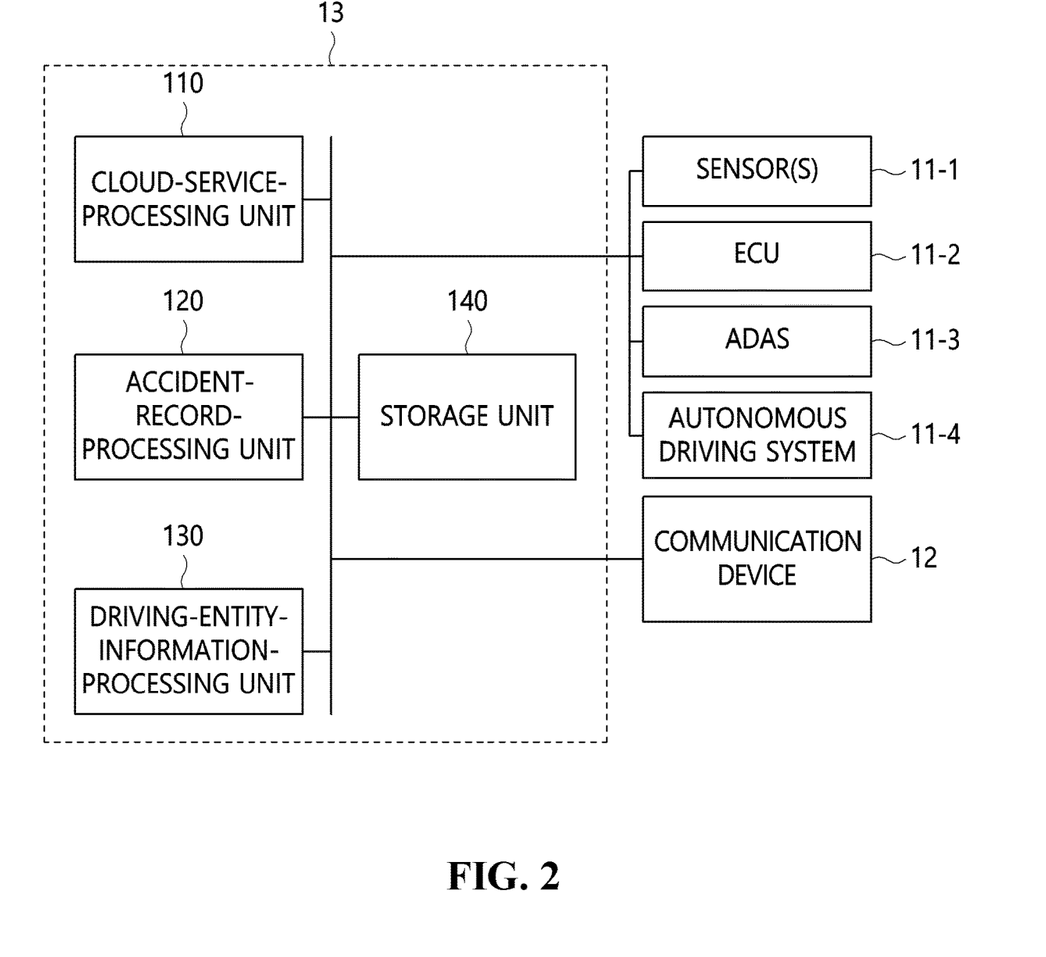
FIG. 2 is a schematic block diagram illustrating the internal structure of a vehicle according to an embodiment.

FIG. 2 is a schematic block diagram illustrating the internal structure of a vehicle according to an embodiment.

Referring to FIG. 2, the vehicle 10 may include sensors 11-1, an Electronic Control Unit (ECU) 11-2, Advanced Driver Assistance Systems (ADAS) 11-3, and an autonomous driving system 11-4.

Here, the sensors 11-1 may be defined as including not only devices for detecting the driving state of the vehicle, that is, whether the vehicle is accelerating, whether the vehicle is decelerating, tire pressure, whether a brake is operating, whether airbags are activated, and the like, but also devices for checking the vicinity of the vehicle, such as radar, LiDAR, a camera, and the like.

The Electronic Control Unit (ECU) 11-2 may be an electronic control device for controlling the states of the engine, the automatic transmission, and the ABS of the vehicle using a computer.

The Advanced Driver Assistance Systems (ADAS) 11-3 may autonomously recognize and determine some of the many situations that can occur when a driver is driving the vehicle, and may control the mechanical device of the vehicle. For example, Autonomous Emergency Braking (AEB), which makes a vehicle slow down or stop autonomously even though a driver does not press a brake pedal when there is a risk of a collision, a Lane-Keeping Assist System (LKAS), which helps a vehicle remain in a lane by steering the vehicle when the vehicle deviates from the lane, Advanced Smart Cruise Control (ASCC), which maintains the distance from a vehicle ahead while maintaining a preset speed, and the like may be included in the ADAS.

The autonomous driving system 11-4 provides service that enables the vehicle to drive itself to a destination by detecting situations using a precise map and the various sensors of the vehicle, such as a Global Positioning System (GPS) and the like, even though a driver does not manipulate a wheel, an acceleration pedal, a brake pedal, or the like.

The communication device 12 is a communication device for transmitting data collected inside the vehicle 10 to the outside and receiving data transmitted from the outside of the vehicle. For example, the communication device 12 may be the telematics device of the vehicle, a Vehicle-to-Everything (V2X) communication device, or an LTE/5G cellular communication device.

The vehicle-data-recording device 13 records vehicle states before and after an accident, which are acquired from the various sensors 11-1, the ECU 11-2, the ADAS 11-3, and the autonomous driving system 11-4 in the vehicle 10, and requests the cloud center device 20 to securely store the same.

Specifically, such a vehicle-data-recording device 13 may include a cloud-service-processing unit 110, an accident-record-processing unit 120, a driving-entity-information-processing unit 130, and a storage unit 140.

The accident-record-processing unit 120 acquires the vehicle state information before and after an accident from the sensors 11-1 and the Electronic Control Unit (ECU) 11-2, and records the same in the storage unit 140. Here, the vehicle states may include the speed of the vehicle, whether a brake is functional, whether airbags are functional, and the like.

The driving-entity-information-processing unit 130 determines whether the entity that was driving the vehicle before and after an accident is a driver, the ADAS of the vehicle, or the autonomous driving system of the vehicle using information acquired from the Advanced Driver Assistance Systems (ADAS) 11-3, the autonomous driving system 11-4, and the various sensors 11-1 of the vehicle, and records the determination in the storage unit 140.

The cloud-service-processing unit 110 may generate vehicle state information from the accident record and the driving entity information stored in the storage unit 140 based on cloud-based vehicle data security policies, and may request the cloud center device 20 to store the same via the communication device 12.

To this end, first, the cloud-service-processing unit 110 has to register the vehicle 10 in the cloud center device 20 in order to receive a cloud-based vehicle data security service.

Here, registration of a cloud-based vehicle data security service may be requested using the mobile communication device of the driver or the communication device 12 installed in the vehicle 10.

Before registration with the cloud-based vehicle data security service is requested, the cloud-service-processing unit 110 may transmit a message signed with a private key to the cloud center device 20, may receive a vehicle authentication response from the cloud center device 20, and may request the registration when the vehicle is successfully authenticated.

The cloud-service-processing unit 110 may receive and acquire cloud-based vehicle data security policies, which are formats of data to be stored in a cloud, a pseudonym for the vehicle, and a pseudonym certificate from the cloud center device 20 after the vehicle is successfully authenticated.

Then, the cloud-service-processing unit 110 may generate vehicle state information, including the vehicle accident record information and information about the entity driving the vehicle, based on the cloud-based vehicle data security policies, and may transmit the same to the cloud center device 20.

Here, the vehicle state information may further include vehicle manufacturer identification information.

Here, the vehicle state information may further include an integrity verification value for each of the accident record information and the driving entity information.

Figure 3:
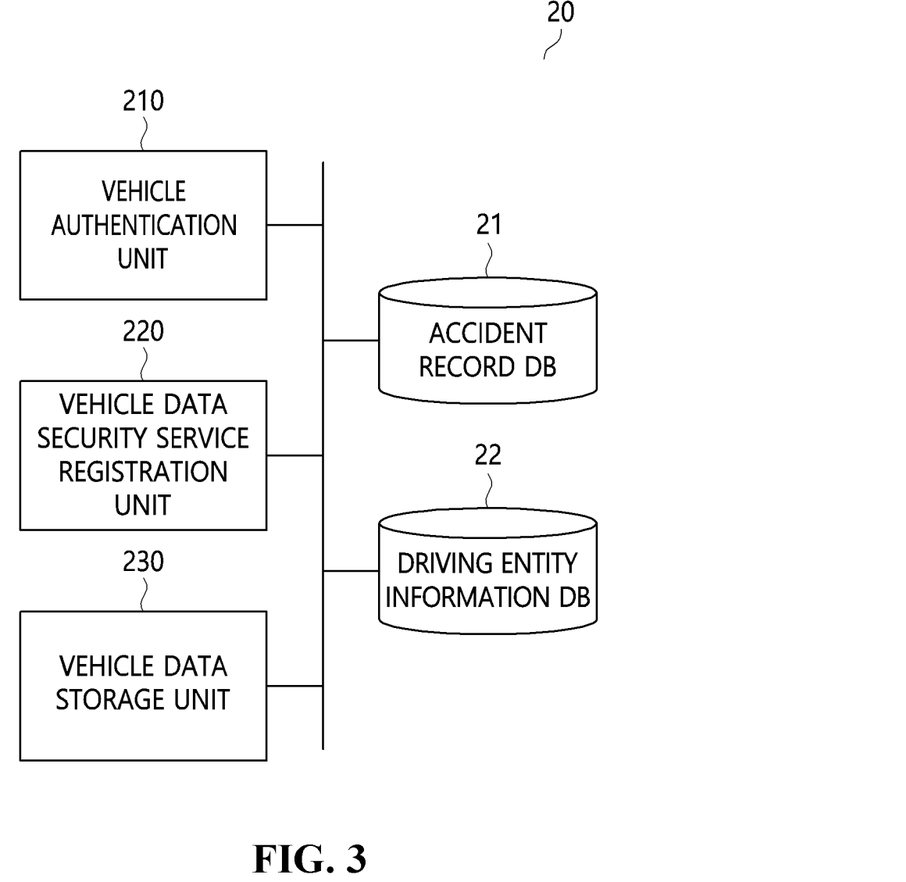
FIG. 3 is a schematic block diagram illustrating the internal structure of a cloud center device according to an embodiment.

FIG. 3 is a schematic block diagram illustrating the internal structure of a cloud center device according to an embodiment.

Referring to FIG. 3, the cloud center device 20 according to an embodiment may include a vehicle authentication unit 210, a vehicle data security service registration unit 220, a vehicle data storage unit 230, an accident record DB 21, and a driving entity information DB 22.

The vehicle authentication unit 210 may receive a message signed with the private key of a vehicle from the vehicle 10, and may verify the message using the public key of the vehicle.

The vehicle data security service registration unit 220 generates cloud-based vehicle data security policies, which are formats of data to be stored in a cloud, and a pseudonym for the vehicle in response to a request to register a cloud-based vehicle data security service from the vehicle 10, requests the authentication center 30 to generate a pseudonym certificate for the generated pseudonym, receives the pseudonym certificate generated by the authentication center 30, and transmits the generated cloud-based vehicle data security policies to the vehicle 10 along with the pseudonym and the pseudonym certificate.

Here, the vehicle data security service registration unit 220 may generate cloud-based vehicle data security policies depending on vehicle driving policies designated in specific attention areas.

The vehicle data storage unit 230 stores vehicle state information, including accident record information and driving entity information generated based on the cloud-based vehicle data security policies, in the databases 21 and 22 after receiving the same from the vehicle 10.

Here, the vehicle state information may further include vehicle manufacturer identification information, and the accident record information of the vehicle and information about the entity driving the vehicle may be stored in the state of being sorted by vehicle manufacturer.

Figure 4:
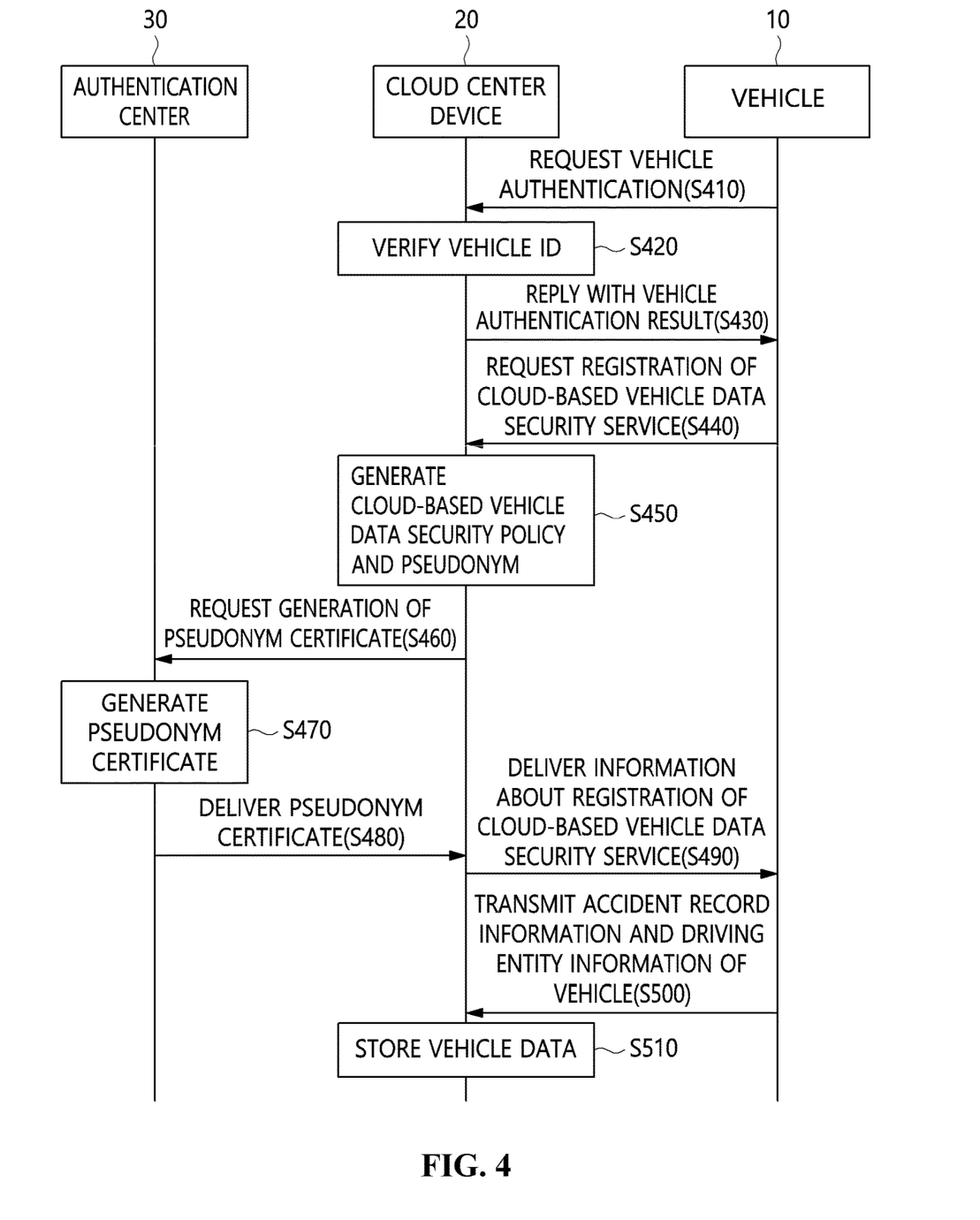
FIG. 4 is a flowchart for explaining a method for processing vehicle data security based on a cloud according to an embodiment.
Figure 5:
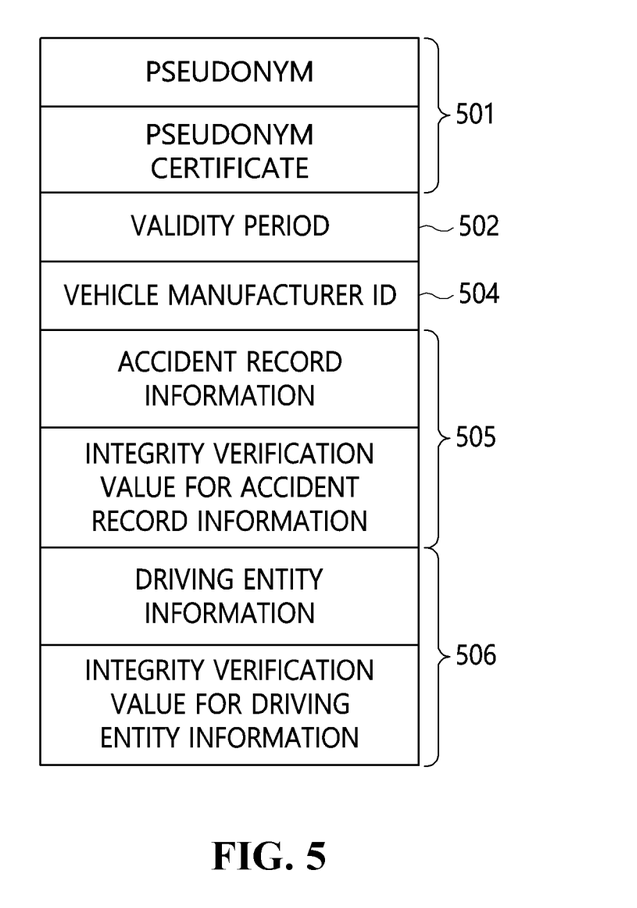
FIG. 5 is an exemplary view of vehicle state information according to an embodiment.

FIG. 4 is a flowchart for explaining a method for processing vehicle data security based on a cloud according to an embodiment, and FIG. 5 is an exemplary view of vehicle state information according to an embodiment.

Referring to FIG. 4, a vehicle 10 requests a cloud center device 20 to authenticate the vehicle at step S410.

Here, a digital signature method based on a public-key-based cryptography system may be used for authentication of the vehicle. That is, a message signed with the private key of the vehicle 10 is transmitted to the cloud center device 20 at step S410.

The cloud center device 20 verifies the identifier (ID) of the vehicle 10, which requested authentication thereof, at step S420.

Here, the cloud center device 20 may verify the message signed with the private key of the vehicle 10 using the public key of the vehicle 10.

The cloud center device 20 transmits a vehicle authentication result to the vehicle 10 as a response at step S430.

When the response indicating the success of vehicle authentication is transmitted at step S430, the vehicle 10 requests the cloud center device 20 to register a cloud-based vehicle data security service at step S440.

In response thereto, the cloud center device 20 generates cloud-based vehicle data security policies and generates a pseudonym of the vehicle 10 at step S450.

Here, the cloud-based vehicle data security policies may include information about formats of data to be stored in the cloud.

That is, in the case of the vehicle accident record information, the cloud-based vehicle data security policies may include a list of data that has to be stored and the range thereof. For example, the time before deployment of an airbag, the time after deployment of the airbag, a reporting interval, and the like may be specified.

Also, in the case of the information about the entity driving the vehicle, a reporting interval and a list of detection signals for detecting the entity may be included.

Here, the pseudonym is a certain number of temporary IDs assigned to each vehicle 10, and information about the relationship with the actual ID of the vehicle 10 is prevented from being exposed outside during vehicle communication, whereby private information pertaining to the location of the vehicle 10 may be protected.

Here, the pseudonym may be set to have a validity period having a fixed length. Here, the validity period is the period for which the accident record information and the driving entity information are stored and maintained in the cloud center device 20.

Then, the cloud center device 20 requests an authentication center 30 to generate a pseudonym certificate for the generated pseudonym at step S460.

The authentication center 30 generates a pseudonym certificate for the pseudonym at step S470.

Then, the authentication center 30 transmits the pseudonym certificate to the cloud center device 20 at step S480.

Here, the pseudonym certificate may be a message signed with the digital signature of the authentication center for the pseudonym. Through the pseudonym certificate, the legitimacy of the pseudonym may be ensured.

The cloud center device 20 transmits the pseudonym, the pseudonym certificate, and the cloud-based vehicle data security policies to the vehicle 10 at step S490.

The vehicle 10 transmits the vehicle accident record information and information about the entity driving the vehicle, which are generated based on the cloud-based vehicle data security policies, to the cloud center device 20 at step S500.

The cloud center device 20 stores the received accident record information and information about the entity driving the vehicle in the database on a per-vehicle basis at step S510.

Here, referring to FIG. 5, the vehicle state information may include the pseudonym and the pseudonym certificate 501 of the vehicle, the validity period 502, the accident record information 505, and the driving entity information 506.

Accordingly, at step S510, the cloud center device 20 stores the accident record information 505 and the driving entity information 506 so as to be mapped to the pseudonym and the pseudonym certificate 501 of the vehicle. As described above, through the use of such a pseudonym, the privacy invasion problem attributable to the exposure of the location of the vehicle 10 may be solved.

Also, at step S510, the cloud center device 20 may store the accident record information and the driving entity information of the vehicle only for the validity period.

According to an embodiment, the vehicle state information may further include a vehicle manufacturer ID 504.

Accordingly, at step S510, the cloud center device 20 may store the accident record information and the driving entity information of the vehicle in the state of being sorted by vehicle manufacturer. Accordingly, when a specific vehicle that has been involved in an accident is investigated, the vehicle accident record information and the information about the entity driving the vehicle, identified by the manufacturer ID, are easily provided to the corresponding manufacturer, whereby the time and expenses consumed for the investigation of the accident may be reduced.

Also, according to an embodiment, the vehicle state information may further include an integrity verification value for each of the accident record information and the driving entity information.

Here, the integrity verification value of the accident record information may be generated using a Message Authentication Code (MAC) of a symmetric-key method. Also, a digital signature of a public-key method may be used for the integrity verification value of the accident record information.

Here, a digital signature of a public-key method may be used for the integrity verification value of the information about the entity driving the vehicle. Also, the information about the entity driving the vehicle may be generated using a Message Authentication Code (MAC) of a symmetric-key method.

As described above, the integrity verification values for the accident record information and the driving entity information are included, whereby data forgery or falsification that may occur is prevented.

Figure 6:
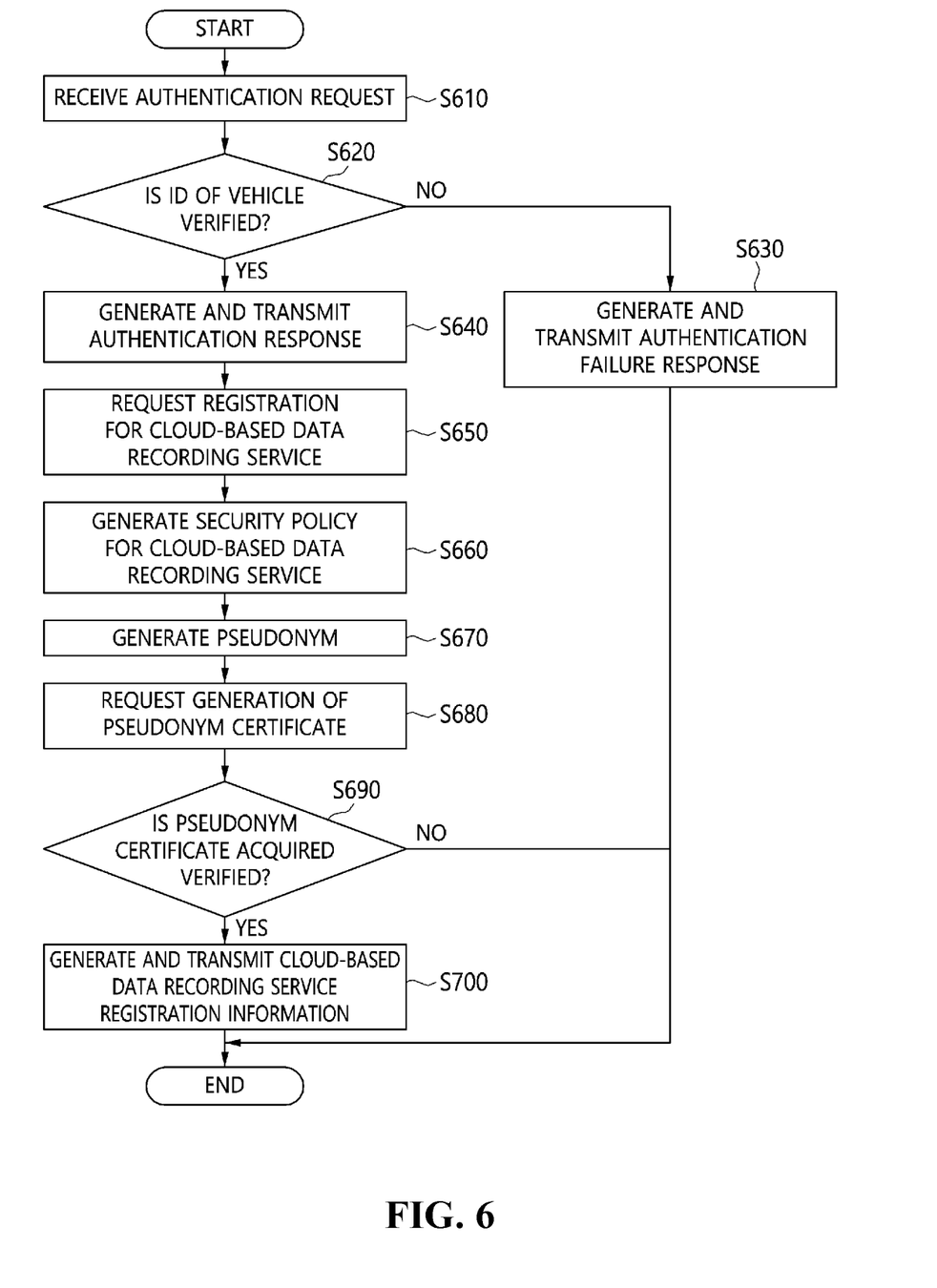
FIG. 6 is a flowchart for explaining the registration procedure of cloud-based data recorders in automotive environments according to an embodiment.

FIG. 6 is a flowchart for explaining cloud-based data recording service registration procedure in automotive environments according to an embodiment.

Referring to FIG. 6, if an authentication request for the registration of a cloud-based data recording service, i.e., a vehicle authentication request, is received from a vehicle to a cloud-based data recording service system in a service execution mode at step S610, the ID of the vehicle should be verified, e.g., using a digital signature algorithm of a public key crypto system, at step S620.

Herein, the authentication request of the vehicle may be performed in a manner of transmitting a message signed with a private key of the vehicle to the cloud-based data recording service system.

As a result of the verification at step S620, if the ID of the vehicle is determined to be invalid, the cloud-based data recording service system generates a corresponding authentication failure response and transmits the authentication failure response to the vehicle at step S630.

On the other hand, as the result of the verification at step S620, if the ID of the vehicle is determined to be valid, the cloud-based data recording service system generates an authentication response for the vehicle and transmits the authentication response to the vehicle at step S640.

Thereafter, when the authentication response is received, i.e., the authentication of the vehicle is achieved, after a user inputs and generates the cloud-based recording service registration information including recording data types and reporting period etc., the vehicle transmits the cloud-based data recording service registration information to the cloud-based data recording service system to thereby request the registration of the cloud-based data recording service at step S650.

Subsequently, if a request for the registration of the cloud-based data recording service, which includes the cloud-based data recording service registration information, is input from the vehicle, the cloud-based data recording service system generates a security policy using the cloud-based data recording service registration information such as the recording data types and recording period, and so on, and then stores/registers information at step S660.

After that, the cloud-based data recording service system assigns a pseudonym to each vehicle at step S670. Then, the cloud-based data recording service system generates a certificate request message for requesting the generation of a pseudonym certificate for the pseudonym assigned to each vehicle and transmits the certificate request message to the authentication center at step S680.

The cloud-based data recording service system monitors whether or not the pseudonym certificate is acquired from the authentication center at step S690. As a result of the monitoring at step S690, if the pseudonym certificate is secured, the cloud-based data recording service system stores the pseudonym certificate in the cloud-based data recording information DB. The pseudonym certificate may be a digitally signed message of the authentication center. It is possible to guarantee the justification of the pseudonym through the pseudonym certificate.

A plurality of pseudonyms may be assigned to each vehicle. Since the pseudonym does not have information associated with an ID of each vehicle, so that it is possible to protect the PII of each vehicle.

If the notification is received thereto, the cloud-based data recording service system generates cloud-based data recording service registration information for each vehicle, stores the cloud-based data recording information DB, and transmits the cloud-based data recording information DB to each vehicle at step S700.

Herein, the cloud-based data recording service registration information may include a pseudonym assigned to each vehicle, a pseudonym certificate for the pseudonym, and so on. Each vehicle, i.e., a user of the vehicle, registered in the cloud-based data recording service can accomplish the cloud-based data recording by performing communications between the cloud center and vehicles using the cloud-based data recording service registration information provided from the cloud-based data recording service system.

Figure 7:
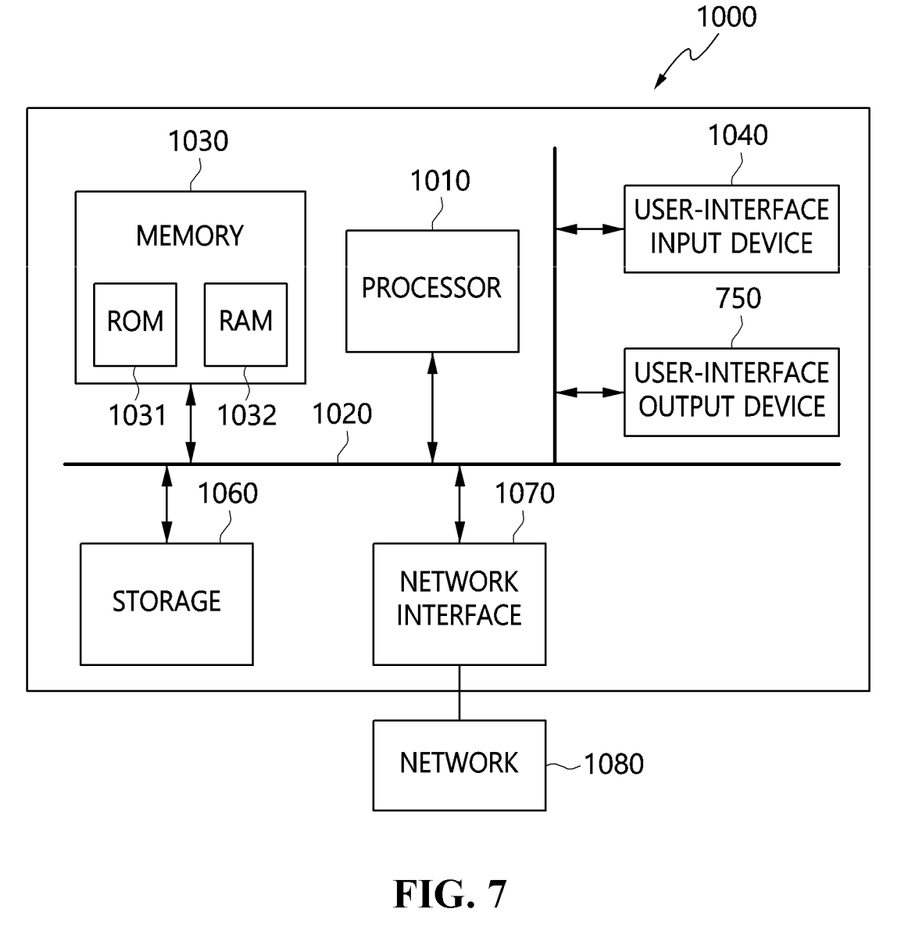
FIG. 7 is a view illustrating a computer system configuration according to an embodiment.

FIG. 7 is a view illustrating a computer system configuration according to an embodiment.

The cloud center device 20 and the vehicle-data-recording device 13 according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, and an information delivery medium. For example, the memory 1030 may include ROM 1031 or RAM 1032.

According to an embodiment, there is an advantage in that vehicle accident record information and information about the entity driving a vehicle, which are stored in the vehicle, can be securely stored in a cloud.

Also, when vehicle accident record information and information about the entity driving a vehicle are acquired through a conventional OBD II port, there is a concern about data loss, forgery, or falsification, but such a problem may be solved by storing the data in a cloud.

Also, a pseudonym is assigned to a vehicle, and a pseudonym certificate is used, whereby privacy invasion attributable to the exposure of the history of locations traveled to by the vehicle may be prevented.

Also, vehicle accident record information and information about the entity driving a vehicle are transmitted after being signed with a digital signature, whereby data forgery or falsification is prevented. Accordingly, there is an advantage in that, when the cause of a vehicle accident is investigated, vehicle accident records and information about the entity driving a vehicle may be provided without forgery or falsification.

Also, when vehicle accident records and information about the entity driving a vehicle are stored and managed, a separately identifiable manufacturer ID is assigned thereto, whereby more accurate data may be quickly provided when a manufacturer and third parties collect data in order to investigate the cause of an accident.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A cloud center device, comprising:
memory in which at least one program is recorded; and
a processor for executing the program,
wherein the program performs:
generating cloud-based vehicle data security policies, which are formats of data to be stored in a cloud, and a pseudonym for a vehicle in response to a request to register a cloud-based vehicle data security service from the vehicle;
requesting an authentication center to generate a pseudonym certificate for the generated pseudonym and receiving the pseudonym certificate generated by the authentication center;
transmitting the generated cloud-based vehicle data security policies to the vehicle along with the pseudonym and the pseudonym certificate,
wherein the program further performs:
before receiving the request to register a cloud-based vehicle data security service from the vehicle,
receiving a message signed with a private key thereof from the vehicle;
verifying the message signed with the private key, which is received from the vehicle, using a public key of the vehicle; and
transmitting a result of authentication of the vehicle to the vehicle,
wherein receiving the request to register a cloud-based vehicle data security service from the vehicle is performed when the vehicle is successfully authenticated.

2. The cloud center device of claim 1, wherein the program performs generating the cloud-based vehicle data security policies and the pseudonym when the vehicle is verified based on an identifier thereof.

3. The cloud center device of claim 2, wherein the program receives a message signed with a private key of the vehicle from the vehicle and verifies the message using a public key of the vehicle.

4. The cloud center device of claim 1, wherein the pseudonym is set to have a validity period.

5. The cloud center device of claim 1, wherein the pseudonym certificate is a message signed with a digital signature of the authentication center for the pseudonym.

6. The cloud center device of claim 1, wherein the program further performs storing vehicle state information received from the vehicle in a database, the vehicle state information including accident record information and driving entity information generated based on the cloud-based vehicle data security policies.

7. The cloud center device of claim 6, wherein:
the vehicle state information further includes vehicle manufacturer identification information, and
the program stores the accident record information and the driving entity information of the vehicle in a state of being sorted by vehicle manufacturer.

8. The cloud center device of claim 6, wherein the vehicle state information further includes an integrity verification value for each of the accident record information and the driving entity information.

9. An apparatus for recording vehicle data, comprising:
memory in which at least one program is recorded; and
a processor for executing the program,
wherein the program performs;
requesting a cloud center device to register a cloud-based vehicle data security service, and
receiving cloud-based vehicle data security policies, which are formats of data to be stored in a cloud, a pseudonym for a vehicle, and a pseudonym certificate from the cloud center device,
wherein the program further performs;
before requesting the cloud center device to register the cloud-based vehicle data security service,
transmitting a message signed with a private key to the cloud center device, and
receiving a vehicle authentication response from the cloud center device, and the program performs requesting the cloud center device to register the cloud-based vehicle data security service when the vehicle is successfully authenticated.

10. The apparatus of claim 9, wherein the program performs generating vehicle state information, including accident record information and driving entity information of the vehicle, based on the cloud-based vehicle data security policies and transmitting the vehicle state information to the cloud center device.

11. The apparatus of claim 10, wherein the vehicle state information further includes vehicle manufacturer identification information.

12. The apparatus of claim 10, wherein the vehicle state information further includes an integrity verification value for each of the accident record information and the driving entity information.

13. A method for managing vehicle data security based on a cloud, comprising:
    requesting, by a vehicle, a cloud center device to register a cloud-based vehicle data security service;
    generating, by the cloud center device, cloud-based vehicle data security policies, which are formats of data to be stored in the cloud, and a pseudonym for the vehicle;
    requesting, by the cloud center device, an authentication center to generate a pseudonym certificate for the generated pseudonym and receiving, by the cloud center device, the pseudonym certificate generated by the authentication center; and
    transmitting, by the cloud center device, the generated cloud-based vehicle data security policies to the vehicle along with the pseudonym and the pseudonym certificate;

further comprising:
    before requesting the cloud center device to register the cloud-based vehicle data security service,
    transmitting, by the vehicle, a message signed with a private key thereof to the cloud center device;
    verifying, by the cloud center device, the message signed with the private key, which is received from the vehicle, using a public key of the vehicle; and
    transmitting, by the cloud center device, a result of authentication of the vehicle to the vehicle,
    wherein requesting the cloud center device to register the cloud-based vehicle data security service is performed when the vehicle is successfully authenticated.

14. The method of claim 13, wherein:
    the pseudonym certificate is a message signed with a digital signature of the authentication center for the pseudonym.

15. The method of claim 13, wherein:
    the vehicle state information further includes vehicle manufacturer identification information, and
    storing the accident record information and the driving entity information is configured such that the cloud center device stores the accident record information and the driving entity information of the vehicle in a state of being sorted by vehicle manufacturer.

16. The method of claim 13, wherein the vehicle state information further includes an integrity verification value for each of the accident record information and the driving entity information.

* * * * *